March 26, 1957     H. J. WILLIAMS     2,786,331

FUEL FEED AND POWER CONTROL FOR GAS TURBINE ENGINES

Filed Aug. 10, 1948     2 Sheets—Sheet 1

INVENTOR
HOWARD J. WILLIAMS
BY
ATTORNEY

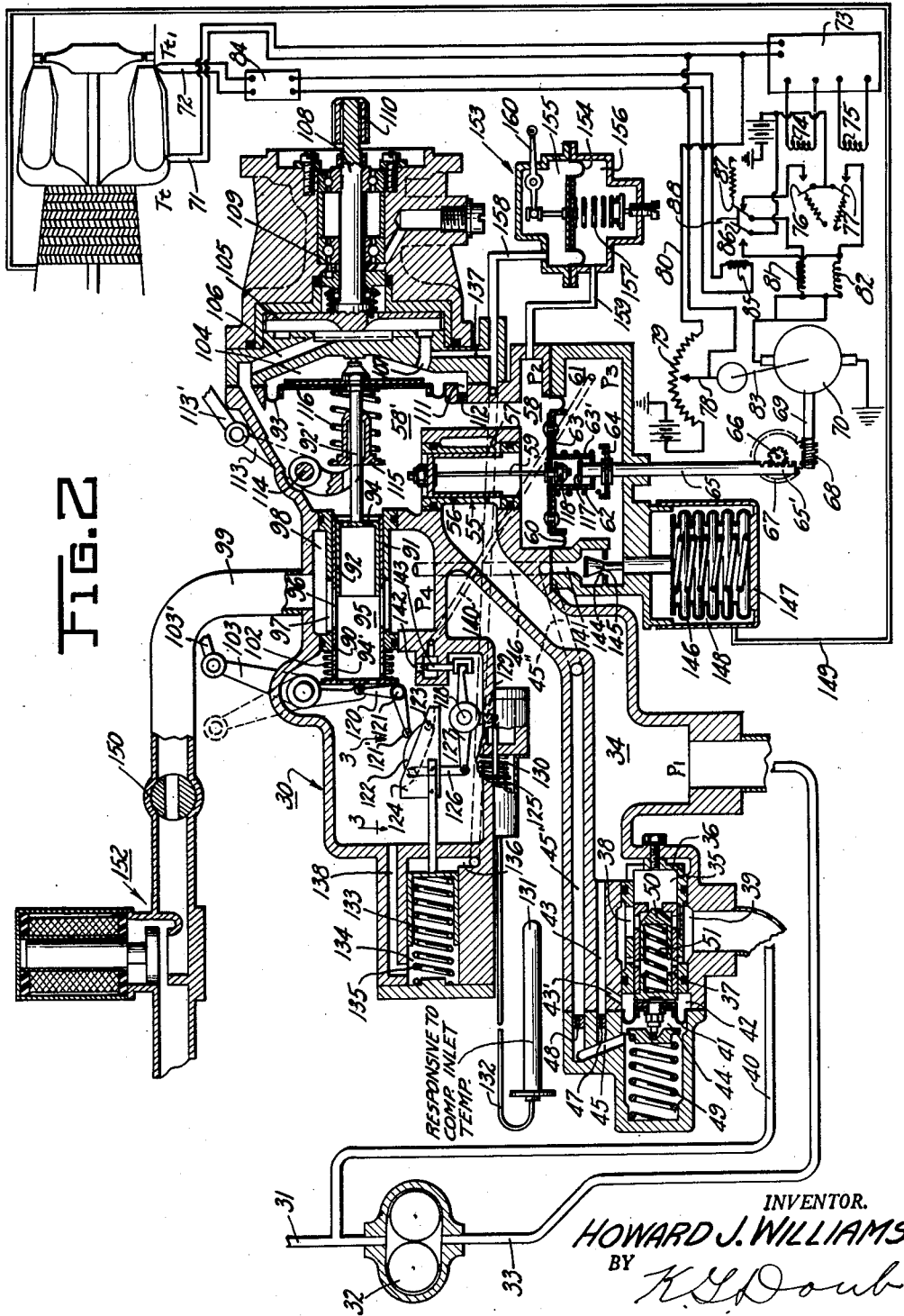

United States Patent Office 2,786,331
Patented Mar. 26, 1957

2,786,331

FUEL FEED AND POWER CONTROL FOR GAS TURBINE ENGINES

Howard J. Williams, South Bend, Ind., assignor to Bendix Aviation Corporation, South Bend, Ind., a corporation of Delaware Application August 10, 1948, Serial No. 43,463

31 Claims. (Cl. 60—39.28)

This invention relates to a fuel feed and power control system for gas turbine engines; it is particularly adapted for gas turbine engines of the variable speed, variable load type such as an aircraft engine utilizing a variable pitch propeller and wherein the power output may be controlled by selectively varying the rate of fuel feed and/or the pitch of the propeller blades.

The invention includes among its objects:

To provide a control for engines of the type specified capable of being operated by a single control element freely without exceeding dangerous temperatures and speed, and without burner failure;

To provide a control for gas turbine engines incorporating a turbine and compressor wherein a pilot or operator may accelerate and decelerate freely without danger of compressor stall due to surge;

To provide means in a control for gas turbine engines of the propeller type whereby fuel feed may be controlled in a manner such as to produce improved stability at all speeds;

To provide an improved fuel feed control for gas turbine engines which meters automatically as a function of engine temperature;

And to generally improve controls for gas turbine engines.

The foregoing and other objects and advantages will become apparent in view of the following description taken in conjunction with the drawings, wherein:

Figure 2 is a sectional schematic of the fuel control system;

In the following description, the term "engine" is used to designate a power unit including a burner or generator, a gas turbine and a dynamic compressor; and the terms "burner" or "generator" are used alternatively to designate the combustion chamber in which the fuel and air are intermingled and burnt to create combustion and expansion of the air and products of combustion, as well as the spray nozzle and associated parts for spraying liquid fuel into the combustion chamber.

Figure 1:
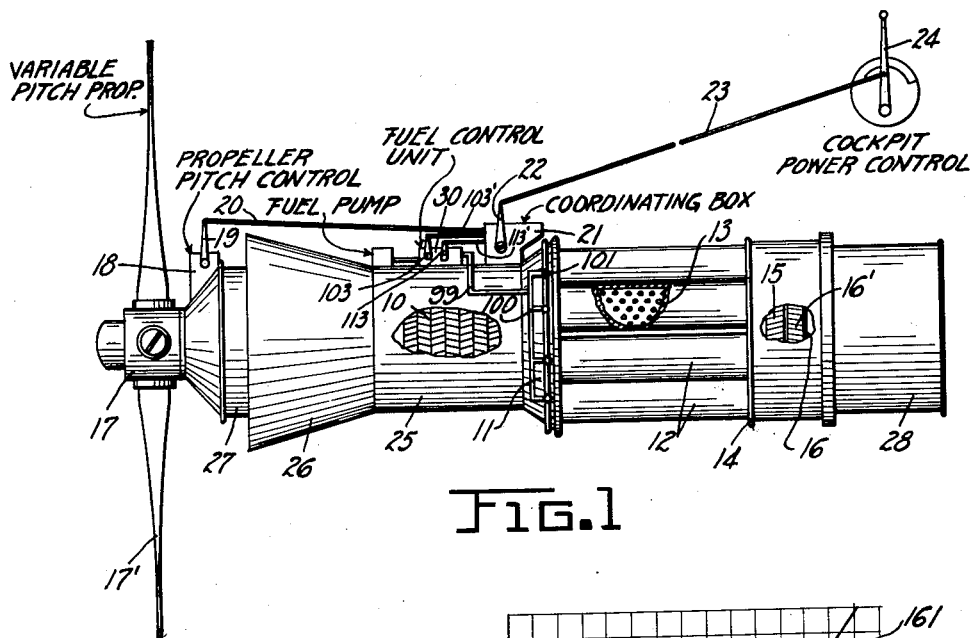
Figure 1 is a view in side elevation and partly broken away of a gas turbine propeller engine equipped with a fuel control system in accordance with the invention.
Figure 3:
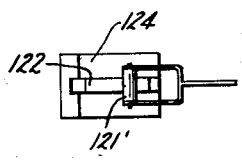
Figure 3 is a sectional detail of the temperature and speed responsive cams which coact with the feed valve to limit fuel feed as a function of compressor inlet temperature and engine speed, the section being taken on the line 3—3 of Figure 2.

Referring first to Figure 1, the engine in general comprises a compressor 10 (shown as of the axial flow type) which forces air into an annular header 11 arranged to direct it to a plurality of annularly spaced combustion chambers 12, each containing a burner or generator tube 13 having air inlet holes in the walls thereof through which at least part of the air is fed for admixture with fuel to produce combustion. The burners 13 discharge into a collector ring 14 arranged to direct the hot air and products of combustion through a set of stationary distributing blades 15 against the blades 16' of a turbine rotor 16. The turbine 16 drives the air compressor 10, and these components may be mounted on a common shaft, not shown, or may be drivingly coupled through transmission mechanism. The turbine, in addition to driving the compressor, is adapted to drive a propeller 17 provided with variable pitch blades 17'. The pitch changing mechanism may be of any suitable type, and since variable pitch propellers are well known and may be purchased as a complete unit in the open market, the pitch changing mechanism is not shown in detail; it includes a control device 18 provided with a control lever 19 having connected thereto a link 20 which is shown as extending back to a coordinating box 21 housing suitable mechanism for coordinating the various engine controls, including fuel feed and propeller pitch, under a single lever 22, the later connecting by means of a link 23 with a pilot's power control lever 24. Since the coordinating mechanism forms no part of the present invention and could, if desired, be omitted and the fuel feed and propeller pitch independently controlled, it is not shown in detail; for an example of coordinating mechanism as regards fuel feed and propeller pitch, reference may be had to the copending application of Frank C. Mock, Serial No. 734,937, filed March 15, 1947. The compressor 10 is mounted in a casing or housing 25, and forwardly of this casing is a flared air intake or cowling 26 which opens in the direction of aircraft travel. The part indicated at 27 houses the reduction gearing between the turbine and propeller drive. As will be understood, the greater part of the available energy resulting from the combustion and expansion of the precompressed air and fuel is utilized in driving the propeller while the remainder (turbine exhaust) is utilized as jet thrust in a tail cone housed in the tail piece 28.

The present invention is primarily concerned with the fuel supply system and coacting controls shown schematically in Figure 2, the principal parts of the system being disposed in a housing generally indicated at 30, note also Figure 1 where the unit is located adjacent the coordinating box 21. Fuel comes in from a source of supply by way of conduit 31 in which is mounted a fuel pump 32 arranged to deliver the fuel under pressure through a conduit 33 to chamber 34. The capacity of the pump should be such as to insure a supply of fuel equal to or in excess of engine demands. A by-pass fuel chamber 35 is defined by a valve housing 36 having a hollow by-pass valve 37 slidingly mounted therein, the valve and housing being ported at 38 to an annular return chamber 39 in communication with a return conduit 40 leading back to the conduit 31. The valve 37 has a stem to which is connected a diaphragm 41 subjected to the differential between pump delivery pressure (indicated as P1 pressure in Figure 2) and metered fuel pressure, or the pressure of fuel leaving the control (indicated as P4 pressure in Figure 2). Accordingly, there is a chamber 42 on one side of said diaphragm which is vented to P1 pressure by means of passage or duct 43, 43', and a chamber 44 on the opposite side of the diaphragm which is vented to P4 pressure by means of a series of communicating passages or ducts indicated at 45, 45', 45", 46. Bleeds or restrictions 47 and 48 are interposed in the passages 43 and 45' for regulating the flow through the balance pressure circuit provided by the said passages, and a spring 49 is mounted in chamber 44 and exerts a predetermined substantially constant closing thrust on valve 37. The fuel supply pressure P1 in chamber 34 will be maintained at a constant value above metered fuel pressure P4 as determined by the strength of spring 49, or in other words, there will be a constant pressure drop across the fuel control unit which is maintained regardless of altitude. The control is thus rendered insensitive to changes in pressure at the burner nozzles as long as the pump 32 is capable of meeting the demand.

A maximum pressure relief valve 50 is slidingly mounted in the hollow by-pass valve 37 and is normally urged toward closed position by a spring 51, the latter having sufficient force to hold the valve 50 closed as long as a predetermined maximum pressure at the burner nozzles is not exceeded. This insures against overloading of the engine and reduction gearing while at the same time it permits maximum fuel flow to the engine consistent with maximum load; and it also prevents excessive pressures from damaging the fuel system should the cut-off valve be suddenly closed at high engine speeds, as for example, in an emergency.

A regulator valve is indicated at 55; it is shown as being in the form of a hollow cylindrical member mounted to slide in a housing 56, the latter being formed with one or a plurality of ports 57 controlling flow of fuel from chamber 34 to chambers 58, 58' of the regulator. Valve 55 has a stem 59 which is connected to a diaphragm 60 overlying a chamber 61. A spring 62 encircles a hollow cylindrical projection 63' formed integral with a lower diaphragm plate 63 and acts in a direction tending to open valve 55 against the differential between P2 pressure in chamber 58 and P3 pressure in chamber 61.

The tension or spring force of spring 62 is a function of compressor discharge temperature $T_t$, and accordingly the lower end of said spring is abutted by a plate 64 secured on a rod 65 having a toothed portion or rack bar 65' in mesh with a pinion 66 forming part of a worm drive including gear 67 adapted to be rotated by a worm 68 secured on the end of a shaft 69 driven by an actuator shown in the form of a direct current reversible electric motor 70, the latter being controlled by means adapted to respond to changes in temperature at the compressor outlet or burner input temperature $T_t$, plus a safety override responsive to turbine input temperature $T_{t1}$. An example of such means is shown diagrammatically in Figure 2; it includes a pair of thermocouples 71 and 72, located to obtain the response above indicated. The thermocouple 71 acts through a normally balanced electronic amplifier and control unit, indicated in block diagram at 73, to energize a pair of relay coils 74 and 75, depending upon the direction of unbalance, which coils when energized close either one of a pair of normally open relay switches 76 and 77. One lead of the thermocouple 71 is electrically connected to a rotatable potentiometer slide 78 arranged to act on a resistance 79 forming part of a reference voltage circuit 80. When switch 76 is closed (assuming temperature below maximum safety temperature), field coil 81 is energized to drive the motor 70 in one direction, and when switch 77 is closed, field coil 82 is energized to drive the motor in the opposite direction. In the example shown, when coil 81 is energized, it causes motor 70 to rotate in a direction to move rod 65 upwardly and cause more fuel to be fed to the burners at a given throttle position and at which time the $T_t$ temperature would be decreasing. The motor 70 has a mechanical connection, indicated in dotted lines at 83, with the slider 78 so as to reset the latter when the circuit to the motor is closed and balance the control unit 73 at the changed setting of the regulator valve 55.

The thermocouple 72 forms part of a maximum temperature limitation circuit; it acts through an amplifier 84 to energize relay coil 85 when the turbine inlet temperature exceeds a predetermined value, said coil when energized closing normally open relay switch 86 and simultaneously opening normally closed switch 87, there being a mechanical connection 88 between these two latter switches. When switch 87 is opened, the motor circuit to field coil 81 is broken, and when switch 86 is closed, a separate supply circuit to the field coil 82 is closed and the motor 70 is rotated in a direction to cause less fuel to be fed to the burners, thereby reducing the temperature at the turbine inlet. The manner in which the temperature control coacts with the regulator valve 55 to establish a predetermined fuel feed for a given temperature will be more fully set forth in the description of operation of the invention.

For a more complete illustration and description of a temperature responsive control capable of effecting the desired results as far as the present invention is concerned, reference may be had to the copending application of H. C. Waterman, Serial No. 792,409, filed December 18, 1947 (common assignee).

A fuel feed or throttle valve is designated at 90; in the form shown it consists of a hollow cylinder slidably mounted in a bushing or housing 91. A speed responsive overspeed governor valve 92 is also movably mounted in the bushing 91; it has a stem 92' connected to a spring loaded speed responsive diaphragm 93, the function of which will presently be described. Fuel at a metering head determined by the regulator flows from chamber 58' through ports 94 and 94' into passage 95 defined by the hollow valves 92 and 90, and thence through variable metering restrictions 96 and 97 into metered fuel chamber 98, from which it flows by way of conduit 99 to a fuel manifold 100 (note Figure 1) which supplies fuel to a series of fuel discharge nozzles 101 adapted to discharge the fuel under pressure into the respective burner tubes 13. The particular construction of the nozzles 101 forms no part of the present invention; for a suitable type of nozzle reference may be had to the copending application of Morris O. Wise, Serial No. 748,214, filed May 15, 1947, now Patent Number 2,569,033. The throttle valve 90, Figure 2, is normally urged toward open position or in a power increasing direction by a spring 102, and may be adjusted manually by means of a throttle lever 103. While this lever may be independently controlled, it is preferably correlated with one or more of the other engine controls through the coordinating unit 21 and accordingly it has an operative connection with said unit by means of a link rod 103'.

Reverting to the overspeed governor valve 92, the diaphragm 93 which controls this valve forms a movable wall between chamber 58' and a chamber 104. An engine driven centrifugal pump or impeller 105 takes fuel from chamber 58' by way of a passage 106 and forces it into chamber 104 by way of a passage 107. Pump impeller 105 is carried by a shaft 108, which is rotatable in sealed bearings 109 and has secured on the outer end thereof a pinion 110 adapted to be driven from the engine. Chamber 104 is vented to chamber 58' by way of a passage 111 having a restriction 112 therein.

Since the impeller is rotated in relation to engine speed, it will produce a pressure differential across the diaphragm 93 proportional to the square of engine speed, and hence the valve 92 will be positioned as a function of engine speed. The overspeed governor setting is preferably by means of a lever 113 which is pivoted or fulcrumed at 114 and at its lower or inner end is forked and engages a bushing 115, the latter being slidable on valve stem or shaft 92' and bearing against the one end of a governor spring 116. The governor lever 113 has connected to the outer end thereof a link rod 113' which projects into the coordinating box 21, Figure 1, where its travel is co-ordinated under one control lever with that of the throttle lever 103. Thus, the setting of lever 113 relatively to that of the throttle 103 may be adjusted, either manually or through coordinated cam action, to enable the valve 92 to become effective against dangerous overspeeds of the turbine and compressor mechanism, not only at maximum power settings, but also at ground idle when the propeller is normally in fixed pitch and when it is at beta angle for reverse thrust speed control.

The upper end of the rod 65 is provided with a contact head 117 adapted to engage the contiguous end of a screw 118 when the $T_t$ temperature is low and the differential across the diaphragm 60 causes the regulator valve to approach its fully closed position, a condition which may exist at low idle speeds and corresponding throttle settings.

The contact head 117 is also adapted to engage the bottom of the cup-shaped member 63' in the event of an over-temperature condition not relieved by reducing the tension on spring 62. Thus, should the rise in $T_t$ temperature be such as to cause movement of rod 65 downward to a point where the contact 117 engages the bottom wall of 63', the regulator valve will immediately be moved to or toward closed position and reduce the rate of fuel feed to the burners. Again, should the diaphragm 60 rupture or break, the same action would prevent the regulator valve 55 from moving to a wide open position and produce a dangerous temperature rise.

A dynamic compressor tends to surge when the discharge pressure varies with respect to inlet or intake pressure to a point where the normal flow characteristics through the compressor are disturbed by high back pressure. With gases such as air, the surge appears as a condition of periodic oscillation between normal onward flow and actual rebound out of the entrance to the compressor. In a gas turbine engine where the compressor rotates in synchronism with, and may in fact be mounted on the same shaft as the turbine wheel, and where efficiency requires close matching of the compressor and turbine capacities, surge becomes a serious problem.

Generally speaking, at the maximum pressure obtainable without surge, the volume of air passing through a dynamic compressor tends to vary as the speed of the compressor. Similarly, the mass weight of air trying to pass through the compressor will vary as the R. P. M. times the entering air density.

In the higher speed ranges where the compressor and turbine pressure may more than double the pressure at the turbine outlet, the velocity through the turbine becomes supersonic and "critical," and under these conditions varies only as the square root of the absolute turbine entering gas temperature. Also, the turbine blades and coacting guide vanes or nozzles act as a fixed size orifice, so that the critical weight or mass flow of air through the turbine varies as the square root of the turbine temperature times the turbine air density; and since the compressor discharge pressure (which is also the turbine inlet pressure) varies as the initial outside or atmospheric pressure at the entrance to the compressor times the square of the compressor R. P. M., the critical weight flowing out through the turbine may be represented as $$\frac{\sqrt{T_{ti}}(P_o \text{ R. P. M.}^2}{T_{ti}} \text{ or } \frac{P_o \text{ R. P.M.}^2}{\sqrt{T_{ti}}}$$

Where:

$T_{ti}$ is the turbine inlet temperature;
$P_o$ is compressor intake pressure;

The tendency to surge will obviously be greater as the pressure ratio or rise across the compressor increases at a given engine speed.

Figure 4:
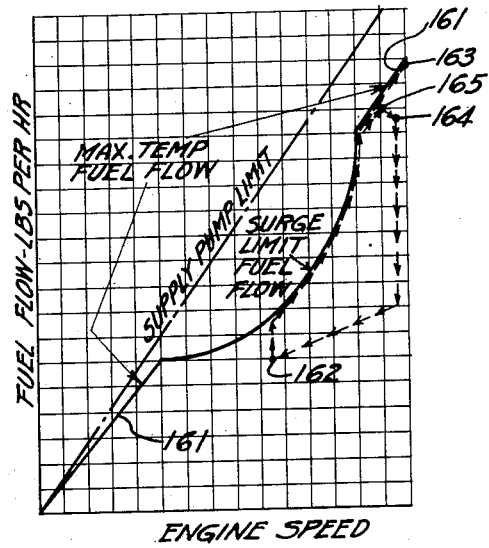
Figure 4 is a curve chart which illustrates the general fuel requirements of the engine in relation to engine speed.

In Figure 4, a hypothetical surge limit for a given outside or compressor inlet temperature is indicated.

In the present invention, surge limit fuel feed at below maximum temperature conditions is automatically controlled as a function of engine speed (which in turn is an index of the pressure rise across the compressor), as a function of entering air density, and as a function of compressor inlet temperature and compressor outlet temperature, the speed and compressor inlet temperature responsive controls acting to vary the throttle valve area while the compressor outlet control being that at $T_t$ above described and including the thermocouple 71 which senses compressor discharge temperature and varies the head across the throttle valve. In addition to its surge limit function, the speed control also acts to set an upper temperature limit on fuel feed during acceleration. The density control will subsequently be described.

An example of a suitable control operative as a function of engine speed and also as a function of compressor inlet temperature is illustrated more or less schematically in Figure 2. A bell crank lever 120 is pivotally anchored or fulcrumed at 121 and has one arm thereof provided with a follower bearing against the end wall of the throttle valve 90 and its other arm provided with another follower 121' bearing against the active surface of a cam 122, the latter at its one end being pivotally connected at 123 to another cam 124 (to be described) and at its opposite end being operatively connected to a temperature responsive bellows 125 by means of link 126, lever 127, shaft 128, lever 129 and rod 130. The bellows 125 has an operative connection with a thermal element such as a temperature bulb 131 by means of a flexible tube 132, the bellows and tube being loaded with suitable fluid or material responsive to changes in temperature registered by the element 131, as is well understood by those having a working knowledge of such devices. The thermal element 131 is preferably positioned at a point where it will register compressor inlet temperature.

Cam 124 is connected to a piston 133 mounted to slide in a cylindrical chamber 134 against the resistance of a loading spring 135. Chamber 134 to the right of piston 133 is in fluid communication with the pressure side of the centrifugal pump or impeller 105 by way of passages 136, 137 and 107. The inner or left-hand side of piston 133 is vented to chamber 58' by a passage 138. The differential across the piston is, therefore, proportional to engine speed when the system is in operation.

During part throttle settings of the lever 103, the pilot has direct manual control of the throttle valve area, but at wide open throttle settings of said lever (the position in full lines in Figure 2) when the engine is operating at maximum temperature as determined by the temperature control acting through the regulator valve 55 to regulate the metering head, the piston 133 positions the cams 124 and 122 as a function of engine speed and determines the maximum opening of the throttle valve, the effective position of cam 122 being modified as a function of compressor inlet temperature, to obtain the desired surge limit fuel flows.

Upon a decrease in the density of air flowing to the engine, less fuel is required to drive the turbine and compressor at a given speed, and unless the maximum rate of fuel delivered to the engine on acceleration is correspondingly reduced, much higher burner temperatures will be experienced during acceleration at altitude than at sea level under similar engine conditions, due to the extremely rich fuel-air ratio. For an engine of the type to which the present fuel feeding system is particularly adapted, fuel flow should vary as a direct function of compressor inlet pressure and as an inverse function of compressor inlet temperature. In the preferred arrangement of the density control circuit, the temperature and pressure components are controlled by independently operating temperature and pressure responsive devices which coact to adjust the metering differential across the throttle valve for any given metering area. Since head is regulated instead of area, as far as density compensation is concerned, the throttle valve has the same travel for a given range of acceleration and deceleration at all altitudes.

Referring again to Figure 2, a passage 140 connects chamber 58' (P2 pressure) with chamber 61 (P3 pressure) while another passage 141, 46 connects chamber 61 with chamber 98 (P4 pressure). At the entrance to passage 140 is a variable bleed orifice 142 controlled by a contoured needle valve 143 carried by the lever 127 which is actuated as a result of changes in compressor inlet temperature registered by the bulb or thermal element 131. At the entrance to passage 141 is another variable bleed orifice 144 controlled by a contoured needle valve 145 carried by the movable end of a spring loaded evacuated pressure bellows 146 having its lower or stationary end anchored to a cup-shaped casing or housing 147 defining a pressure chamber 148. A conduit 149 communicates compressor inlet pressure to the latter chamber.

Since the regulator pressure differential across diaphragm 60 (P2 minus P3) is determined by spring 62 which responds to changes in the temperature rise across the compressor, or turbine input temperature, for a given area of orifice 142, a definite quantity of fuel flows from chamber 58' through passage 140 into chamber 61; and this same quantity must pass through the bleed area or orifice 144 controlled by the pressure needle 145 and through passage 141, 46 to chamber 98. For a given area of pressure orifice 144, this flow establishes a given pressure drop between chamber 61 and chamber 98. Upon an increase in compressor inlet pressure, bellows 146 tends to collapse, resulting in a decrease in the area of orifice 144; and for a given bleed flow, or a given position of temperature needle 143, a decrease in the area of orifice 144 increases the pressure differential between chambers 61 and 98, or P3 minus P4. Since the differential between chambers 58' and 98 (P2 minus P4) must equal the differential between chambers 58' and 61 (P2 minus P3) plus the differential between chamber 61 and chamber 98 (P3 minus P4), then P2 minus P4 must also increase, resulting in an increase in flow through the throttle valve ports for any given area of the latter. Again, a decrease in compressor inlet temperature as indicated by thermal element 131 causes needle 143 to enlarge the area of the temperature orifice 142, increasing the bleed flow through passages 140 and 141, 46; and for a given area of pressure orifice 144, this increase in bleed flow results in an increase in P3 minus P4 and a corresponding increase in P2 minus P4.

A decrease in compressor inlet pressure and/or an increase in compressor inlet temperature has the reverse effect, viz. a decrease in flow across the throttle valve.

In brief, the action of the density bleed circuit is to by-pass fuel around the throttle valve, the rate of by-pass flow being controllable as a function of pressure and temperature and therefore density, to thereby vary the drop across the throttle valve at a given position of the latter in relation to a complex function of pressure and temperature and/or changes in density.

A manual fuel cut-off valve is indicated at 150; it is usually connected to the cockpit control for completely shutting off flow of fuel to the burners when the engine is stopped. A coacting solenoid cut-off valve 152 may also be installed in the fuel conduit 99 to facilitate starting, the arrangement preferably being such that when the pilot moves the cockpit quadrant out of cut-off, the manual cut-off is opened and the solenoid cut-off closed, the latter remaining closed until the engine reaches a predetermined speed.

The unit generally indicated at 153 is a speed responsive device which may be used as a switch control or for any other purpose to which it may be adapted. It consists of a diaphragm 154 which forms a movable wall between two chambers 155 and 156 and is loaded by an adjustable spring 157, the upper chamber 155 being in pressure communication with impeller 105 by way of passages 107, 137 and 158 and the lower chamber 156 being vented to chamber 58 (P2 pressure) by passage 159. A lever 160 is operatively connected to the diaphragm 154 and may be utilized to operate one or more switches (not shown) during the starting cycle, or for other purposes. The spring 157 is preferably calibrated or adjusted to produce movement of lever 160 proportional to engine speed.

Operation

The usual method of starting gas turbine engines of the type shown is by means of an electric starting motor and coacting controls such as the starting apparatus disclosed in the copending application of A. A. Kuzmitz, Serial No. 730,622, filed February 24, 1947 (common assignee), now Patent No. 2,667,742, issued February 2, 1954, the motor being engaged and the burners fired until the engine attains a self-sustaining speed, whereupon the starting circuit cuts out and the starting motor is disengaged. The idle speed or low power setting of the throttle lever 103 is indicated in dotted lines in Figure 2 (at which time the throttle valve 90 would be pushed inwardly or toward the right against the resistance of the spring 102) and the high power setting of said lever is indicated in full lines. It should be noted that the throttle valve is moved impositively by spring 102 in a power increasing direction and positively moved by lever 103 in a power decreasing direction.

The control system of the present invention enables a pilot to operate a gas turbine propeller engine freely without danger of exceeding rated capacities as to speed and temperature without stall and with a minimum of hunting or surging. Acceleration and deceleration may be had through coordinated control of fuel feed and propeller pitch or it may be through selective control of these components. With respect to the rate of fuel feed, this is regulated by varying the area of the throttle valve metering ports and/or by varying the metering head across the said valve. Certain of the controls act through the regulator valve 55 to vary the head at any selected position of the throttle, while other of the controls act on the throttle valve 90 to vary the metering area. In Figure 4, the line 161 indicates the maximum temperature limit of fuel flow, or a maximum rate of fuel feed which may be maintained for any material length of time without endangering the burner system and correlated parts. This limit is determined by the temperature override control having its origin in the thermocouple 72, and also by the speed cam 124 in cooperation with the temperature control having its origin in the thermocouple 71. The dip in the line represents the upper limit of fuel flow to be maintained without surge, said flow at high power settings of lever 103 being determined by the speed responsive piston 133 and the cams 122 and 124. Part throttle fuel flows in the power range are established by manual control of throttle valve area and $T_t$ control of the metering head through regulation of the regulator valve 55.

For maximum temperature fuel flow, the metering principle may be expressed by the equation $$W_f = K_1 \frac{P_o}{T_o^x} Ny(2160° R - T_t)$$

For part throttle operation, the metering principle may be expressed by the equation $$W_f = K_2 \frac{P_o}{T_o^x}(2160° R - T_t)$$

Where $W_f$ equals fuel flow;
$K_1$, a constant;
$P_o$, compressor inlet pressure;
$T_o$, compressor inlet or intake temperature;
$x$ and $y$ variable exponents;
$N$, engine speed;
$2160°$ R, upper limit of turbine inlet temperature;
$T_t$, compressor outlet temperature;
$K_2$, a throttle constant.

The basic metering principle is based on the fundamental equation that quantity or rate of fuel flow through an orifice is proportional to area times the square root of the head across the orifice. For maximum temperature metering, the area of the throttle orifice or orifices 96 is controlled as a function of speed through the centrifugal pump 105 and diaphragm 93, and the metering head across the throttle valve is controlled by the temperature rise (2160 minus Tt) and the compressor inlet density factor Po divided by To$^x$. A basic head is established by the temperature rise acting through the thermocouple 71, electronic control and amplifier unit 84 and motor 70 to vary the spring loading of the regulator diaphragm 60, and this head is multiplied or increased by the density factor as the density increases.

Fuel is metered on the basis that the weight of fuel supplied to the burners should be proportional to the weight of air times the temperature rise through which the air is raised, Wf∝Wa (T2 minus T1). If we assume 2160° R as the value of final temperature at the turbine inlet and Tt the temperature at the burner inlet, the equation may be expresesd as Wf∝Wa (2160 minus Tt. The density factor $$\frac{P_o}{T_o^x}$$

times the speed factor N in the foregoing maximum temperature equation is an expression of the air flow.

Part throttle fuel metering differs from maximum temperature fuel metering in that the speed factor is substantially removed, but the speed factor will re-enter at any time the fuel flow at part throttle should tend to exceed the maximum temperature limit, surge limit or top speed limit.

To illustrate the actual or physical operation of the control, let it be assumed that in Figure 4 the engine is operating at the point 162 and the pilot desires to accelerate to the point 163, neglecting altitude or the factor $$\frac{P_o}{T_o^x}$$

The throttle lever 103 would be rotated in a clockwise direction to its extreme right-hand position, whereupon the valve 90 would be moved toward the left or in an opening direction by the spring 102, increasing the area of the metering orifices 96, and the fuel feed will rise to the surge limit and follow this line and the maximum temperature line until the engine is operating at top speed for a given propeler pitch and at the upper temperature limit, which may be at maximum power output. When the throttle lever 103 is suddenly released from contact with the throttle valve 90, the latter would immediately open wide were it not restrained automatically by the speed responsive cam 120 and coacting compressor inlet temperature responsive cam 122.

However, since for an engine having a given surge characteristic, the particular location of the surge area is a function of compressor inlet temperature and engine speed, the piston 133 will position cam 124 and the temperature responsive bellows 125 will position cam 122 to determine the effective area of the throttle valve 90, while at the same time the thermocouple control at Tt will sense compressor discharge temperature and act through the regulator valve 55 to maintain a predetermined metering head across the throttle valve 90; and these respective controls coact to determine the surge limit fuel flow.

As the engine speed increases, the effective action of cams 122 and 124 as regards metering area and the effective action of control Tt as regards metering head modifies the rate of fuel flow until the maximum temperature line 161 is reached; and should fuel flow tend to increase beyond this line, the thermal control at Tt1 overrides the control at Tt and reduces the metering head to the proper value.

Should the pilot wish to accelerate from point 162 to point 164 at a part throttle settling, then the fuel flow would rise to the surge limit and follow this line to point 165 and then drop to point 164; it may or may not reach the maximum temperature limit, depending upon conditions of operation.

Deceleration through fuel feed regulation is had primarily by manual throttling, although at any part throttle condition, the temperature responsive control at Tt will influence the metering head across the throttle valve, until the contacts 117 and 118 engage, whereupon the regulator valve attains its furthest closed position. Assuming deceleration from point 164 back to point 162 by suddenly partially closing the throttle valve, then the fuel flow would be about as indicated by the deceleration arrows connecting these points. Should the throttle be suddenly moved to low idle position, the regulator valve will maintain sufficient head across the throttle valve to prevent burner failure due to extremely low fuel flows while the compressor is delivering relatively high pressure due to momentum.

In Figure 4, the respective examples of operation are assumed to take place at or near ground level density. As altitude increases, the rate of fuel feed for a given engine speed decreases, and consequently the respective fuel flow curves would swing lower toward the right-hand corner of the figure.

In the claims, the term "fuel conduit" is used to broadly define the path of flow of fuel through the fuel control unit shown in Figure 2 which connects pump discharge conduit 33 with metered fuel conduit 99.

Although only one embodiment of the invention has been illustrated and described, various changes in the form and relative arrangement of the parts may be made to suit requirements.

I claim:

1. In a fuel feed and power control system for a gas turbine engine having a burner or generator which air is supplied under pressure by a dynamic compressor driven by the turbine, a fuel conduit for conducting fuel to the burner having a metering restriction therein, a throttle valve for varying the area of said restriction, a regulating valve movable to different positions to vary the head across said restriction, means responsive to changes in burner inlet temperature for regulating said latter valve, and a device responsive to changes in turbine temperature arranged to override said first-named temperature responsive means for automatically maintaining an upper temperature limit on the rate of fuel feed.

2. In a fuel feed and power control system for a gas turbine engine having a burner or generator to which air is supplied under pressure by a dynamic compressor driven by the turbine, a fuel conduit for conducting fuel to the burner valve means for regulating the flow of fuel through said conduit, means responsive to turbine temperature arranged to control said valve means to maintain an upper limit on the rate of fuel feed, and means responsive to changes in compressor discharge temperature and engine speed for regulating the rate of fuel feed during operation of the engine within said limit.

3. A fuel feed and power control system as claimed in claim 2 wherein a throttle valve is provided for varying the rate of fuel feed to the burner and in cooperative relation therewith is a regulating valve effective to vary the fuel head across said throttle valve, and the means responsive to turbine temperature is arranged to take over control of the regulating valve and reduce the head across the throttle valve when the turbine temperature rises beyond a predetermined value and thereby maintain an upper limit on the rate of fuel feed, and the means responsive to burner inlet temperature is arranged to control the regulating valve at part throttle flows within said upper temperature limit.

4. In a fuel feed and power control system for a gas turbine engine having a burner or generator to which air is supplied under pressure by a dynamic compressor driven by the turbine, a fuel conduit for conducting fuel to the burner having a metering restriction therein, a throttle valve for varying the area of said restriction, a device for selectively controlling the throttle valve to accelerate and decelerate the engine, a regulating valve movable to different positions to control the head across said throttle valve, means for controlling turbine inlet temperature operatively connected to said regulating valve and effective to move the latter in a direction to reduce the head across the throttle valve should the turbine inlet temperature exceed a predetermined value, said throttle valve being operable independently of said control device during acceleration of the engine, and means responsive to changes in engine speed for automatically modifying the position of the throttle valve, whereby the conditions of compressor instability and excessive turbine temperature are avoided.

5. In a fuel feed and power control system for a gas turbine engine having a burner or generator to which air is supplied under pressure by a dynamic compressor driven by the turbine, a fuel conduit for conducting fuel to the burner, a throttle valve in said conduit, means for selectively actuating said valve to accelerate and decelerate the engine, means operating as a function of compressor inlet temperature and pressure and engine speed and coacting means operating as a function of compressor discharge temperature for automatically regulating the flow through said conduit independently of said throttle valve actuating means to maintain a predetermined compressor stall limit on the rate of fuel flow during a transient condition following adjustment of the throttle valve to accelerate the engine.

6. In a fuel feed and power control system as claimed in claim 5 wherein the means for actuating the throttle valve permits independent movement of said valve during acceleration and deceleration of the engine, and the means operating as a function of compressor inlet temperature and engine speed includes cam and lever means movable in relation to changes in temperature and engine speed for overriding said actuating means and a coacting device for modifying the head across said valve in relation to changes in entering air pressure, and the means responsive to changes in compressor discharge temperature comprises a thermal device and a valve having an operative connection with the thermal device and movable to different positions to vary the head across the throttle valve at a given position of the latter.

7. A fuel feed and power control system as claimed in claim 5 wherein means responsive to turbine inlet temperature are provided for reducing fuel flow when a predetermined upper turbine temperature limit is reached to thereby establish an upper limit of fuel flow.

8. In a fuel feed and power control system for a gas turbine engine having a burner or generator to which air is supplied under pressure by a dynamic compressor driven by the turbine, a fuel conduit for conducting fuel to the burner, a throttle valve in said conduit, means for selectively actuating said valve to accelerate and decelerate the engine, means operating as a function of compressor inlet temperature and pressure and engine speed and coacting means operating as a function of burner inlet temperature for automatically regulating the flow through said conduit independently of said throttle valve-actuating means to maintain a predetermined surge limit on the rate of fuel flow when the throttle valve is adjusted to different positions to accelerate and decelerate the engine, said throttle valve being spring-actuated toward open position and said means operating as a function of compressor inlet temperature and engine speed including a member adapted to engage the throttle valve, cam means operatively connected to said member, and means responsive to changes in engine speed modified by changes in compressor inlet temperature for positioning said cam means.

9. In a fuel feed and power control system for a gas turbine engine, a fuel throttling orifice, means for varying the area of said orifice to vary the rate of fuel feed to the engine, an engine speed control coacting with said area varying means to also vary said throttling orifice including fuel flow regulating valve means responsive to changes in engine speed, and means coordinated with said area varying means for automatically adjusting said speed responsive flow regulating valve means in such a manner that the engine speed control becomes effective at any predetermined rate of engine speed to vary the area of said throttling orifice.

10. In a fuel feed and power control system for a gas turbine engine, a main fuel flow control orifice, acceleration control means for selectively varying the area of said orifice to vary the rate of fuel feed to the burner; and engine speed control mechanism coacting with said acceleration control means including means responsive to changes in engine speed, a flow regulating valve connected to said latter means adapted to vary the area of said orifice and a control device coordinated with said acceleration control means adjustable to determine the speed versus fuel flow relationship at which the engine speed control becomes effective to reduce fuel flow.

11. In a fuel feed and power control system for a gas turbine engine having a burner or generator to which air is supplied under pressure by a dynamic compressor driven by the turbine, a throttle valve, means for actuating said valve to selectively accelerate and decelerate the engine, a regulator valve movable to different positions to vary the fuel head across the throttle valve, means responsive to burner inlet temperature for modifying the action of said regulator valve, and a device responsive to turbine inlet temperature arranged to override said burner inlet temperature responsive means when the turbine inlet temperature exceeds a predetermined value to thereby maintain fuel flow within an upper limit having as its modulus a predetermined engine operating temperature.

12. In a fuel feed and power control system for a gas turbine engine for aircraft having a burner or generator to which air is supplied under pressure by a dynamic compressor driven by the turbine, a fuel conduit for conducting fuel to the burner having a metering restriction therein, a throttle valve for varying the area of said restriction, and means for regulating the fuel head across said throttle valve comprising a by-pass conduit arranged to by-pass fuel around said throttle valve, a valve operable as a function of compressor inlet pressure, compressor inlet pressure responsive means operatively connected to said latter valve, another valve operable as a function of compressor inlet temperature, and separate compressor inlet temperature responsive means operatively connected to said other valve, said two last mentioned valves being adapted to coact to modify said by-pass flow.

13. In a fuel feed and power control system for a gas turbine engine having a burner or generator to which air is supplied under pressure by a dynamic compressor, a fuel conduit for supplying fuel under pressure to said burner or generator, means in said conduit providing a variable metering restriction comprising a throttle valve having a valve member resiliently urged in a direction to increase the area of said restriction, a pilot's control device connected to said valve member and adapted to positively close said valve member in opposition to said resilient means to decelerate the engine and to release said valve member to accelerate the engine, and means responsive to changes in compressor inlet temperature for modifying the rate of opening movement of said valve member.

14. A fuel feed and power control system as claimed in claim 13 wherein said valve member has its rate of opening movement also modified as a function of engine speed.

15. In a fuel feed and power control system for a gas turbine engine having a burner or generator to which air is supplied under pressure by a dynamic compressor, a fuel conduit for supplying fuel under pressure to said burner or generator, means in said conduit providing a variable metering restriction comprising a throttle valve having a pair of coacting valve members at least one of which is mounted for movement relative to the other to vary the area of said restriction, means resiliently urging said movably mounted valve member in a direction to increase the area of said restriction, a control device adapted to selectively actuate said latter valve member in opposition to said resilient means to select a new operating speed for the engine, means responsive to changes in compressor inlet temperature arranged to modify the rate of opening movement of said movably mounted valve member, and means responsive to changes in an additional engine operating parameter adapted to also modify the action of said movably mounted valve member.

16. In a fuel feed and power control system for a gas turbine engine having a burner or generator to which air is supplied under pressure by a dynamic compressor, a fuel conduit for conducting fuel under pressure to the burner or generator having a metering restriction therein, a throttle valve movable to vary the area of said restriction, a control device adapted to engage the throttle valve for selectively accelerating and decelerating the engine, the operating connection between said control device and throttle valve being such as to permit a limited range of independent movement of the valve at part throttle settings of said device, a regulating valve for adjusting the fuel head across said throttle valve, means responsive to changes in compressor inlet temperature and engine speed for modifying the position of the throttle valve, and means for controlling turbine inlet temperature operatively connected to said regulator valve.

17. In a fuel feed and power control system for a gas turbine engine, fuel control valve means, means for selectively actuating said valve means to accelerate and decelerate the engine, a governor for controlling engine speed by regulating said valve means, means for adjusting said governor, means for regulating the fuel head across said valve means, and limiting means controlling the rate of opening travel of said valve means, said limiting means being regulated as a function of engine speed independently of said governor adjusting means.

18. A fuel feed and power control system as claimed in claim 17, wherein said means for regulating the fuel head is controlled as a function of compressor intake air pressure.

19. A fuel feed and power control system as claimed in claim 17, wherein said limiting means is regulated both as a function of engine speed and compressor inlet temperature.

20. In a fuel feed and power control system for a gas turbine engine having a burner or generator to which air is supplied under pressure by a compressor, throttle means for determining the rate of fuel feed during steady state operation, means for limiting the maximum rate of fuel feed during acceleration under maximum safe turbine inlet temperature requirements, and means for limiting the rate of fuel feed at lesser values than said first-named limiting means as a function of compressor inlet temperature and at selected points in the speed range to avoid compressor instability.

21. A fuel feed and power control system as claimed in claim 20 wherein said limiting means includes cam means and actuating means therefor controlled as a function of engine speed and compressor inlet temperature.

22. In a fuel feed and power control system for a gas turbine engine having a combustion chamber to which air is supplied under pressure by a compressor, at least one fuel nozzle arranged to discharge fuel into said chamber, a fuel supply conduit, a fuel control device in said conduit upstream of said nozzle, a pump for pressurizing fuel through said conduit, said device and said nozzle, said device having a fuel valve for restricting flow of fuel from said pump to said nozzle, and associated throttle control means to determine the rate of fuel feed during steady state operation, means for limiting the maximum rate of fuel feed during acceleration under maximum safe turbine inlet temperature requirements, and means for limiting the rate of fuel feed at lesser values than said first-named limiting means as a function of compressor inlet temperature and at selected points in the speed range to avoid compressor instability.

23. In a fuel feed and power control system for a gas turbine engine having a burner or generator to which air is supplied under pressure by a compressor, a fuel conduit for conducting fuel under pressure to the burner having a metering orifice therein, means for varying the area of said orifice, and means for varying the metering head across said orifice including means responsive to turbine inlet temperature, and means responsive to compressor inlet pressure and temperature, said turbine inlet temperature responsive means including electrical amplifying and signal means operable in response to changes in said turbine temperature.

24. In a fuel feed and power control system for a gas turbine engine having a burner or generator to which air is supplied under pressure by a compressor, means for regulating flow of fuel to the burner including a valve for modifying the rate of fuel feed to avoid compressor stall and a valve for modifying the rate of fuel feed to compensate for changes in compressor inlet temperature, a device for sensing compressor inlet temperature, and means operatively connecting said device to said valves for modifying the flow regulating functions thereof.

25. A system as claimed in claim 24 wherein one of said valves controls the area of a metering restriction and the other of said valves modifies the fuel metering head across said restriction and said device is common to both valves.

26. A fuel feed and power control system as claimed in claim 17, wherein said means for regulating the fuel head is controlled as a function of compressor inlet temperature.

27. In a fuel feed and power control system for a gas turbine engine having a burner or generator to which air is supplied under pressure by a compressor, a fuel conduit for conducting fuel to the burner, a fuel metering valve in said conduit, means for selectively actuating said valve to accelerate and decelerate the engine, said means permitting said valve to be controlled independently thereof during acceleration, means responsive to compressor inlet temperature, an operative connection between said temperature responsive means and said valve for modifying the rate of opening movement of said valve as a function of compressor inlet temperature, means responsive to changes in engine speed, and an operative connection between said engine speed responsive means and said valve for modifying the rate of opening movement of said valve as a function of engine speed, whereby an optimum limit on the rate of fuel flow during a transient condition following adjustment of said metering valve is maintained.

28. In a fuel feed and power control system for a gas turbine engine having a burner or generator to which air is supplied under pressure by a dynamic compressor, a fuel conduit for supplying fuel under pressure to said burner or generator, means in said conduit providing a variable metering restriction comprising a throttle valve having a pair of coacting valve members at least one of which is mounted for movement relative to the other to vary the area of said restriction, means resiliently urging said movable mounted valve member in a direction to increase the area of said restriction, a control device adapted to selectively actuate said latter valve member in opposition to said resilient means to select the new operating speed for the engine, means responsive to changes in engine speed arranged to modify the rate of opening movement of said movably mounted valve member, and means responsive to changes in an additional engine operating parameter adapted to also modify the action of said movably mounted valve member.

29. In a fuel feed and power control system for a gas turbine engine having a burner or generator to which air is supplied under presure by a compressor, a fuel conduit for conducting fuel to the burner, a fuel metering valve in said conduit, means for selectively actuating said valve to accelerate and decelerate the engine, said means permitting said valve to be controlled independently thereof during acceleration, means responsive to changes in engine speed, an operative connection between said engine speed responsive means and said valve for modifying the rate of opening movement of said valve as a function of engine speed, means responsive to changes in an additional engine operating parameter, and an operative connection between said last mentioned means and said valve for modifying the rate of opening movement of said valve as a function thereof, whereby an optimum limit on the rate of fuel flow during a transient condition following adjustment of said metering valve is maintained.

30. In a fuel system for gas turbine engines and the like having fuel injectors and a fuel supply conduit to the fuel injectors, a valve member in said conduit, normally-operative control means to move said valve member to control the supply of fuel through the injectors, abutment means connected to said valve member, an adjustable stop including co-operating abutment means to engage the first said abutment means, fluid-pressure-sensitive adjusting means connected to said stop and subjected to a pressure difference dependent on an operating variable which is at least in part dependent on the speed of the engine, and resilient means to load said adjusting means in opposition to said fluid pressure, whereby the position of the stop is adjusted when the value of said operating variable varies.

31. In a fuel control system for an engine, a fuel metering valve movable to different positions to vary the rate of fuel flow in relation to valve travel, an adjustable engine speed governor operatively connected to said valve for effecting movement of the latter, means for adjusting said governor to select an operating speed for the engine, and means movable through different flow regulating positions effective to limit the valve travel to a metering rate conforming a predetermined engine acceleration schedule.

References Cited in the file of this patent
UNITED STATES PATENTS

| | | |
|---|---|---|
| 1,047,506 | Dawson | Dec. 17, 1912 |
| 2,039,495 | Schlosser | May 5, 1936 |
| 2,058,868 | Hansen | Oct. 27, 1936 |
| 2,159,979 | Parsons | May 30, 1939 |
| 2,306,953 | Jung | Dec. 29, 1942 |
| 2,336,052 | Anderson et al. | Dec. 7, 1943 |
| 2,341,257 | Wünsch | Feb. 8, 1944 |
| 2,378,037 | Reggio | June 12, 1945 |
| 2,404,428 | Bradbury | July 23, 1946 |
| 2,422,808 | Stokes | June 24, 1947 |
| 2,435,902 | Reggio | Feb. 10, 1948 |
| 2,449,468 | Greenland | Sept. 14, 1948 |
| 2,456,604 | Barfod | Dec. 14, 1948 |
| 2,457,595 | Orr | Dec. 28, 1948 |
| 2,474,033 | Chamberlin et al. | June 21, 1949 |
| 2,479,813 | Chamberlin et al. | Aug. 23, 1949 |
| 2,489,586 | Ray | Nov. 29, 1949 |
| 2,499,232 | Strub | Feb. 28, 1950 |
| 2,508,260 | Holley | May 16, 1950 |
| 2,545,703 | Orr | Mar. 20, 1951 |
| 2,576,352 | Neal | Nov. 27, 1951 |
| 2,581,275 | Mock | Jan. 1, 1952 |
| 2,581,276 | Mock | Jan. 1, 1952 |

FOREIGN PATENTS

| | | |
|---|---|---|
| 560,196 | Great Britain | Mar. 24, 1944 |
| 934,814 | France | Jan. 19, 1948 |